(12) United States Patent  
Wong et al.

(10) Patent No.: US 9,029,818 B2
(45) Date of Patent: May 12, 2015

(54) OPTOELECTRONIC DEVICE AND METHOD OF MANUFACTURE

(75) Inventors: Jimmy Chee Mang Wong, Singapore (SG); Roger Chen, Singapore (SG); Shiun Dar Lee, Singapore (SG)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 316 days.

(21) Appl. No.: 13/529,843

(22) Filed: Jun. 21, 2012

(65) Prior Publication Data

US 2013/0341537 A1    Dec. 26, 2013

(51) Int. Cl.
*H01L 31/12* (2006.01)
*H04B 10/80* (2013.01)

(52) U.S. Cl.
CPC ......... *H04B 10/802* (2013.01); *Y10T 29/49117* (2015.01)

(58) Field of Classification Search
USPC ................................................. 250/551, 239
See application file for complete search history.

(56) References Cited

U.S. PATENT DOCUMENTS

| 4,446,375 | A | * | 5/1984 | Aird ............................. 250/551 |
| 4,694,183 | A | * | 9/1987 | Merrick et al. ............... 250/551 |
| 7,488,964 | B2 | | 2/2009 | Horino |
| 7,852,186 | B2 | | 12/2010 | Fouquet et al. |
| 2012/0007005 | A1 | | 1/2012 | Schunk et al. |

OTHER PUBLICATIONS

Been et al., "Designing medical devices for isolation and safety", available at http://www.internationalcoil.com/Pictures/IEC60601-1%20ARTICLE.pdf, Avago Technologies, May 24, 2007, 3 pages.
Analog Devices, "Analog Devices' Digital Isolation Update", available at http://www.analog.com/static/imported-files/newsletters/digital_isolation/iCoupler_0308.html, iCoupler News, Analog Devices, Inc., Mar. 2008, 5 pages.

* cited by examiner

*Primary Examiner* — Tony Ko

(57) ABSTRACT

An optoelectronic device is disclosed. The optoelectronic device may be employed as a single or multi-channel opto-coupler that electrically isolates one circuit from another circuit. The opto-coupler may include one or more folded leads that establish an enhanced isolation gap. The enhanced isolation gap increases the creepage distance of the opto-coupler and increases operational voltages that can be accommodated by the opto-coupler.

20 Claims, 12 Drawing Sheets

OPTOELECTRONIC DEVICE AND METHOD OF MANUFACTURE

FIELD OF THE DISCLOSURE

The present disclosure is generally directed toward optoelectronic devices and, in particular, opto-coupling devices.

BACKGROUND

In electronics, an opto-coupler, also referred to as an opto-isolator, photocoupler, or optical isolator, is an optoelectronic device designed to transfer electrical signals by utilizing light waves to provide coupling with electrical isolation between its input and output. One goal of an opto-coupler is to prevent high voltages or rapidly changing voltages on one side of the circuit from damaging components or distorting transmissions on the other side.

A typical opto-coupler includes a light source, such as a Light Emitting Diode (LED), a photodetector, and an insulation medium. As the name suggests, an optical path needs to be created between the LED and photodetector via the insulation medium. This is traditionally done by using an optically-transparent material such as silicone to create the light path. The insulation medium not only acts to allow the transmission of light from the LED to the photodetector, but the insulation medium also electrically insulates the input and output sides of the circuit.

Certain applications have stringent design rules regarding the true distance between the high voltage and low voltage side of the circuitry. In opto-couplers, the true distance between the high voltage side and low voltage side of the Printed Circuit Board (PCB) translates to be the closest metal-to-metal distance within the opto-coupler. This distance is often referred to as the opto-coupler's Distance Through Insulation (DTI), creepage distance, or the like. It should be appreciated that the DTI of opto-couplers is an important design consideration/constraint.

SUMMARY

It is, therefore, one aspect of the present disclosure to provide an improved opto-coupler design that overcomes and addresses the above-mentioned issues. In particular, embodiments of the present disclosure provide an opto-coupler with a folded leadframe design. By folding the leadframe one or more times, an increased DTI is achieved. In some embodiments, an increased DTI in a horizontal aspect (e.g., an original plane of the leadframe and the larger dimension of the opto-coupler) is achieved. Furthermore, the opto-coupler design may comprise co-planar leadframes on the input and output side and the one or more folds of the leadframe can increase the DTI in the same plane (e.g., the horizontal plane) as the leadframes are situated.

In some embodiments, both an input side of the leadframe and an output side of the leadframe are folded across an input side fold line and output side fold line, respectively. The sensitive components of the opto-coupler (e.g., optoelectronic devices, wires, etc.) may be provided on one side of a fold line whereas other parts of the opto-coupler (e.g., lead ends) may be provided on the other side of a fold line.

It should be appreciated that any number of folds and fold lines can be accommodated by embodiments of the present disclosure. In some embodiments, the input and output sides of the leadframe may be folded from anywhere between 0 and 180 degrees and the different sides of the leadframe may be folded in the same or opposite directions. More explicitly, both the input and output side may be folded up or down. Alternatively, the input side may be folded up whereas the output side may be folded down or vice versa.

BRIEF DESCRIPTION OF THE DRAWINGS

The present disclosure is described in conjunction with the appended figures, which are not necessarily drawn to scale.

DETAILED DESCRIPTION

Figure 1A:
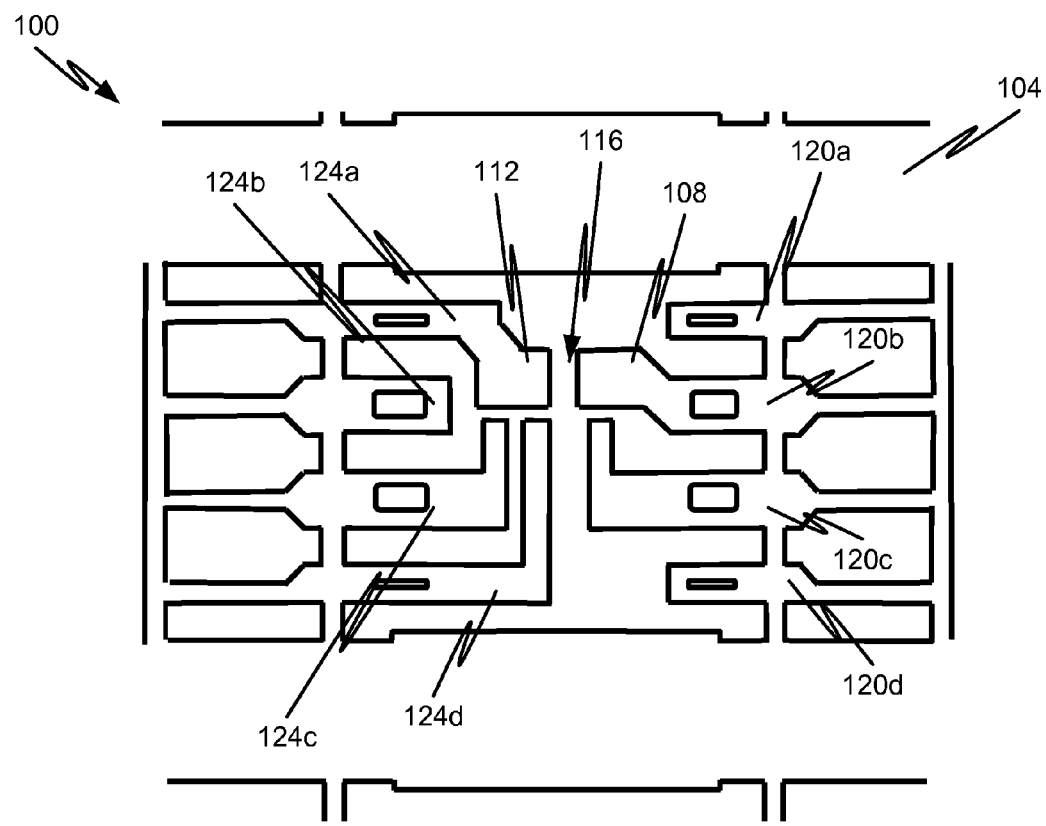
FIG. 1A is top view of an opto-coupler in a first manufacturing step in accordance with embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

As can be seen in FIGS. 1-10 and 12, various configurations of optoelectronic devices, opto-couplers, and intermediate opto-coupler configurations are depicted and described. Although many of the opto-couplers depicted in the figures correspond to opto-couplers at intermediate stages of manufacturing, one of ordinary skill in the art will appreciate that any of the intermediate products described herein can be considered an opto-coupler. In other words, one or more of the optoelectronic devices may be employed as opto-couplers or as components within a coupling system. In some embodiments, the opto-coupler devices described herein may be incorporated into any system which requires current and/or voltage monitoring, but is susceptible to transients. In some embodiments, the coupling system in which the opto-coupler devices described herein is rated to operate at about 5 kV, 10 kV, or more. Stated another way, the input side (e.g., a high-voltage side) of the opto-coupler device may be directly connected to a 5 kV, 10 kV, 15 kV or greater source without damaging the opto-coupler device or any electronic devices attached to the output side (e.g., a low-voltage side) of the opto-coupler device. Accordingly, the coupling system which employs the opto-coupler devices disclosed herein may be configured to operate in high-voltage or high-current systems but may also be configured to separate the high-voltage or high-current systems from a low-voltage or low-current system.

Referring initially to FIGS. 1-11, a process of manufacturing an opto-coupler according to a first possible configuration will be described in accordance with embodiments of the present disclosure. It should be appreciated that the method steps described herein (e.g., the steps of FIG. 11) may be performed in any order and are not limited to the examples described herein. Moreover, the method described herein can be used to manufacture any type of opto-coupler device described herein, including any intermediate opto-coupler or alternative opto-coupler configuration (e.g., the opto-coupler of FIGS. 1-10 or the opto-coupler of FIG. 12).

At a first step, a sheet 100 comprising a leadframe 104 for an opto-coupler is received (step 1104). The sheet 100, in some embodiments, may correspond to a sheet of metal. The received leadframe 104 may have features for creating a single opto-coupler device or multiple opto-coupler devices. In some embodiments, the leadframe 104 may have features for simultaneously creating a plurality of opto-coupler devices. Specifically, the sheet of metal 100 may comprise a two-dimensional array of working spaces where each working space comprises the features of the single opto-coupler depicted in FIGS. 1A and 1B. Accordingly, although embodiments of the present disclosure will describe the process for manufacturing a single opto-coupler device, it should be appreciated that such steps may be duplicated in simultaneously or in parallel to increase the number of opto-couplers that are manufactured by a given process at a given time. Moreover, certain manufacturing steps described herein may be performed in an order other than that described or two or more steps may be combined into a single manufacturing step.

Referring back to FIGS. 1A and 1B, the leadframe 104 may comprise a plurality of features that have been created to establish various parts of an opto-coupler. These features may have been created in the leadframe 104 by any suitable process such as stamping, cutting, etching, etc. Specifically, a sheet of conductive material may have certain portions removed therefrom to establish discrete conductive elements. The conductive elements of the leadframe 104 may be constructed of metal (e.g., copper, silver, gold, aluminum, steel, lead, etc.), graphite, and/or conductive polymers.

In some embodiments, the received leadframe 104 comprises a first side 108 and a second side 112 separated by an isolation gap 116. As can be seen in FIG. 1B, the leadframe 104 may initially be received in a planar form (e.g., as a sheet). Thus, the isolation gap 116 initially comprises a first length that corresponds to a shortest distance between leads of the first side 108 and second side 112. The first length of the isolation gap 116 is substantially entirely in the original plane of the leadframe 104. For conversational purposes, the original primary plane of the leadframe 104 may be referred to as the x-direction or x-plane and the thickness of the leadframe 104 may be considered to be in the y-plane or y-direction. Thus, the isolation gap 116 originally only has a dimension in the x-plane or x-direction.

The first side 108 of the leadframe 104 may correspond to an input side of the opto-coupler and the second side 112 of the leadframe 104 may correspond to an output side of the opto-coupler. The input side 108 may be configured for connection to a circuit whose current and/or voltage is being measured and the output side 112 may be configured for connection to measurement and/or control circuitry.

The first side 108 may comprise a plurality of individual leads 120*a-d* and the second side 112 may also comprise a plurality of individual leads 124*a-d*. In the initial manufacturing stages, the individual leads 120*a-d*, 124*a-d* may be connected to one another via connecting portions of the leadframe sheet 100. Eventually, these connecting portions will be cut or removed thereby electrically isolating the first side 108 from the second side 112. Once the connecting portions are removed (e.g., the opto-coupler has been singulated or trimmed), the isolation gap 116 will correspond to the shortest distance across an insulating medium between the first side 108 and second side 112. Thus, the isolation gap 116 will also correspond to the creepage distance of the opto-coupler.

Figure 1B:
FIG. 1B is a side view of the opto-coupler depicted in FIG. 1A.

As can be seen in FIG. 1A, one of the leads on the first side 108 (e.g., second lead 120*b*) may include an enlarged area as compared to the other leads. This enlarged area may correspond to an eventual bonding or mounting surface for an optical component of the opto-coupler. Similarly, the second side 112 may also comprise one or more leads (e.g., first lead 124*a*) that has an enlarged area configured to receive and support one or more optical components of the opto-coupler.

Although the illustrative leadframe 104 depicted herein comprises four leads 120*a-d* on the first side 108 and four leads 124*a-d* on the second side 112, embodiments of the present disclosure are not so limited. Rather, the leadframe 104 may be provided with a greater or lesser number of leads on either side 108 or 112. Specifically, the first side 108 may comprise one, two, three, four, five, six, seven, eight, or more leads. The second side 112 may comprise the same number of leads as the first side 108 or it may comprise either a greater or lesser number of leads than the first side 112. The specific configuration of leads on the first and second sides 108, 112 should not be limited to the examples described herein.

Figure 2A:
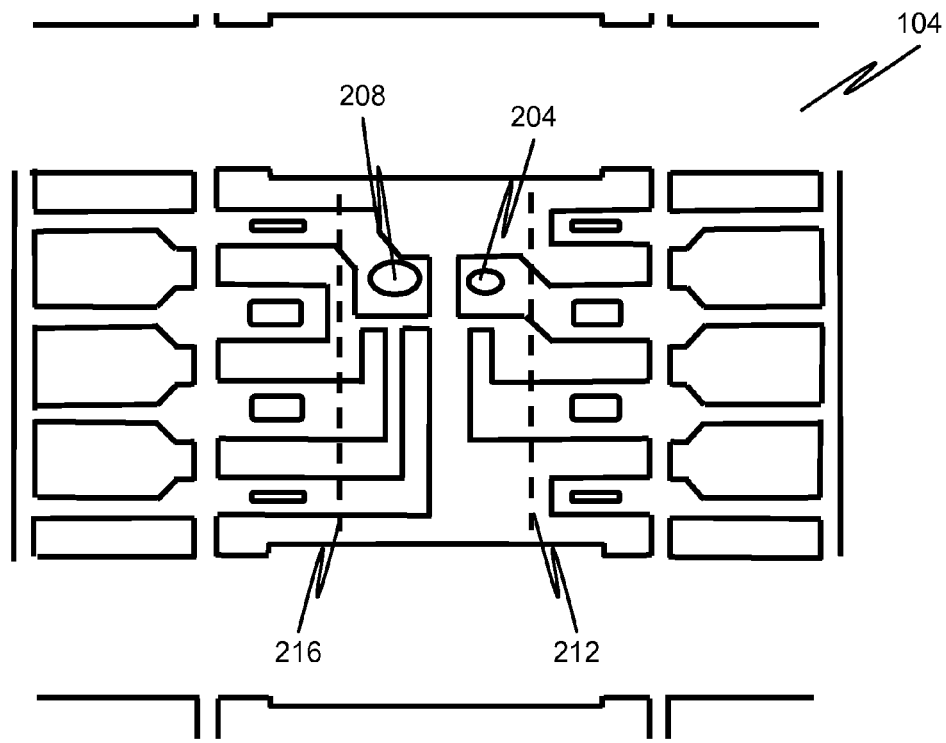
FIG. 2A is a top view of an opto-coupler in a second manufacturing step in accordance with embodiments of the present disclosure.
Figure 2B:
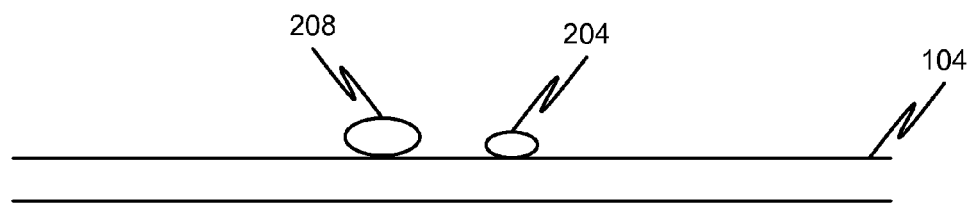
FIG. 2B is a side view of the opto-coupler depicted in FIG. 2A.

The manufacturing process continues with the attachment of a light source and light detector to the leadframe 104 (step 1108). The attachment process may be performed in a couple of steps and is generally depicted in FIGS. 2A, 2B, 3A, and 3B. As can be seen in FIGS. 2A and 2B, a first step of attaching the optical components is shown where a first adhesive 204 is applied to the bonding area of lead 120*b* of the first side 108. Additionally, a second adhesive 208 is applied to the bonding area of lead 124a of the second side 112. The first and second adhesives 204, 208 may be applied simultaneously or sequentially. In some embodiments, the adhesives 204, 208 may correspond to any type of known adhesive or compound used to affix or attach an optical device to metal. It may also be possible to employ welding, soldering, or similar bonding techniques that employ conductive materials rather than non-conductive adhesive materials. Non-limiting examples of the types of adhesives or adhesive materials that may be used for the adhesives 204, 208 include thermosetting epoxies, UV curable epoxies, adhesive tapes, solder, etc.

In some embodiments, the first adhesive 204 is applied to the bonding area of the lead 120b between the isolation gap 116 and a first fold line 212. Likewise, the second adhesive 208 is applied to the bonding area of the lead 124a between the isolation gap 116 and a second fold line 216. This means that both adhesives 204, 208 are positioned between both fold lines 212, 216.

Figure 3A:
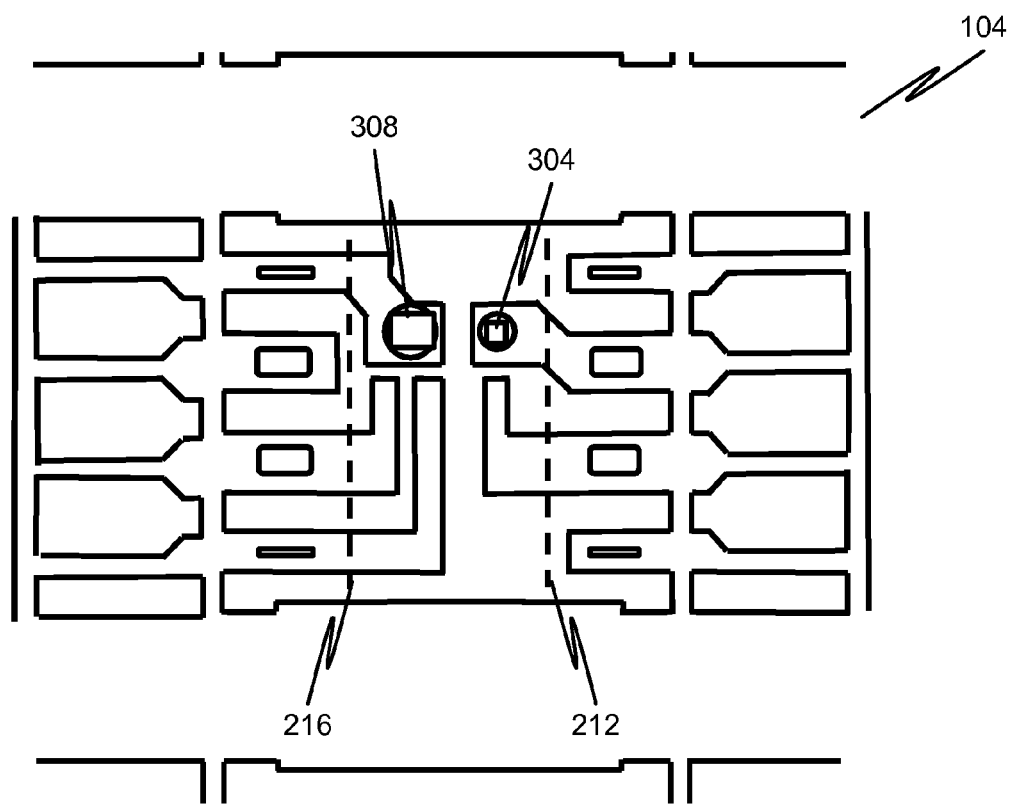
FIG. 3A is a top view of an opto-coupler in a third manufacturing step in accordance with embodiments of the present disclosure.
Figure 3B:
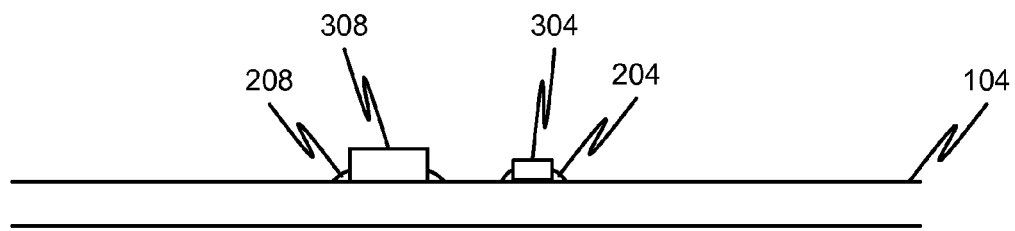
FIG. 3B is a side view of the opto-coupler depicted in FIG. 3A.

As depicted in FIGS. 3A and 3B, a light source 304 may be connected to the first side 108 via the first adhesive 204 and a light detector 308 may be connected to the second side 112 via the second adhesive 208.

The light source 304 and light detector 308 may be used to transmit signals across the isolation gap 116 in the form of optical signals. The signals transmitted across the isolation gap 116 may correspond to electrical signals that are converted into optical signals by the light source 304. The light detector 308 then converts the optical signals back into electrical signals for transmission across one or more of the leads 124a-d of the second side 112.

In some embodiments, the light source 304 may be a single light source or a plurality of light sources. Likewise, the light detector 308 may be a single detector component or multiple detector components.

In some embodiments, the light source 304 corresponds to a surface mount LED, a traditional LED (e.g., with pins for thru-hole mounting), an array of LEDs, a laser diode, or combinations thereof. The light source 304 is configured to convert electrical signals (e.g., current and/or voltage) from one or more of the leads 120a-d into light. The light emitted by the light source 304 may be of any wavelength (e.g., either in or out of the visible light spectrum).

In some embodiments, the light detector 308 corresponds to device or collection of devices configured to convert light or other electromagnetic energy into an electrical signal (e.g., current and/or voltage). Examples of a suitable light detector 308 include, without limitation, a photodiode, a photoresistor, a photovoltaic cell, a phototransistor, an Integrated Circuit (IC) chip comprising one or more photodetector components, or combinations thereof. Similar to the light source 304, the light detector 308 may be configured for surface mounting, thru-hole mounting, or the like.

In some embodiments, one surface of the light source 304 is an anode and another surface of the light source 304 is a cathode. One of the anode and cathode may be electrically connected to one of the leads 120a-d and the other of the anode and cathode may be electrically connected to a different one of the leads 120a-d. By creating a potential between the anode and cathode of the light source 304, the light source 304 may be configured to emit light of a predetermined wavelength. It should be appreciated that not every lead 120a-d needs to be connected either physically or electrically with the light source 304.

Like the light source 304, the light detector 308 may be mounted on one of the leads 124a-d of the second side 112 and may be electrically connected to one or more leads 124a-d of the second side 112. In some embodiments, the manufacturing process continues by establishing an electrical connection between the optical components and the leads of the leadframe 104 such that voltage and/or current at the leads can be converted into optical energy or vice versa by the optical components. Accordingly, the light source 304 and light detector 308 may be connected to one or more of the leads of the leadframe 104 with one or more wires 404, 408.

Input side wires 404 may be used to carry current from a lead on the first side 108 to the light source 304. Output side wires 408 may be used to carry current from the light detector 308 to an output circuit via one or more of the leads 124a-d. It should be appreciated that neither the light source 304 nor the light detector 308 are to be electrically or physically connected to every lead 120a-d, 124a-d, although such a configuration is possible.

Figure 4A:
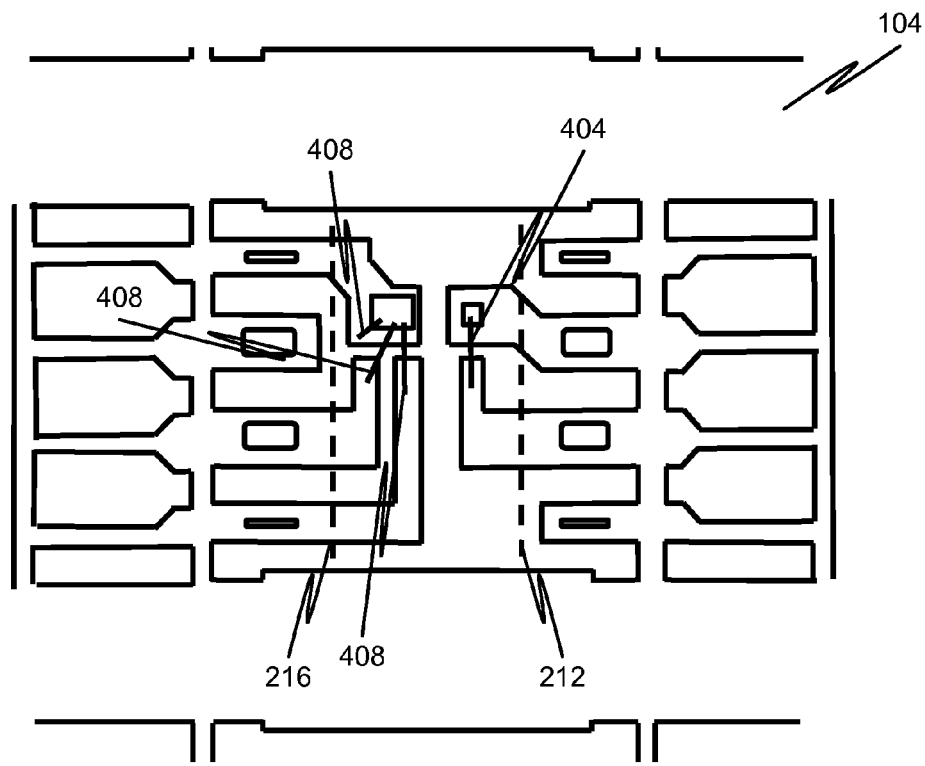
FIG. 4A is a top view of an opto-coupler in a fourth manufacturing step in accordance with embodiments of the present disclosure.

FIG. 4A shows how both input side wires 404 and output side wires 408 are provided between the fold lines 212, 216. In other words, it may be advantageous to restrict the wires from crossing the fold lines 212, 216 as this may ultimately cause undue stress or tension to be exerted on the wires when the leads are folded at the fold lines 212, 216.

Figure 4B:
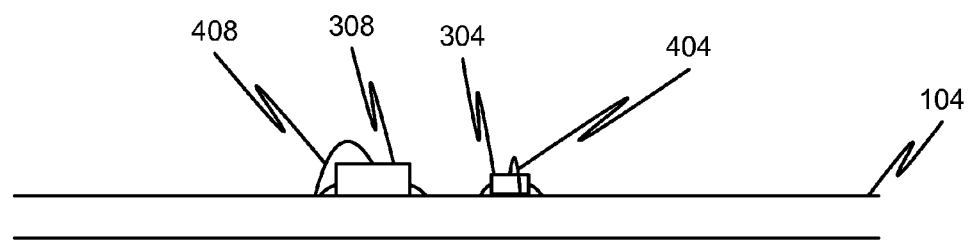
FIG. 4B is a side view of the opto-coupler depicted in FIG. 4A.

FIG. 4B shows a simplified view of the output side wires 408. In particular, although there are three output side wires 408 depicted in FIG. 4A, FIG. 4B only shows a single output side wire 408. This is not intended to limit embodiments of the present disclosure, but rather is intended to simplify the embodiments depicted in the figures to ease understanding of the present disclosure.

Figure 5A:
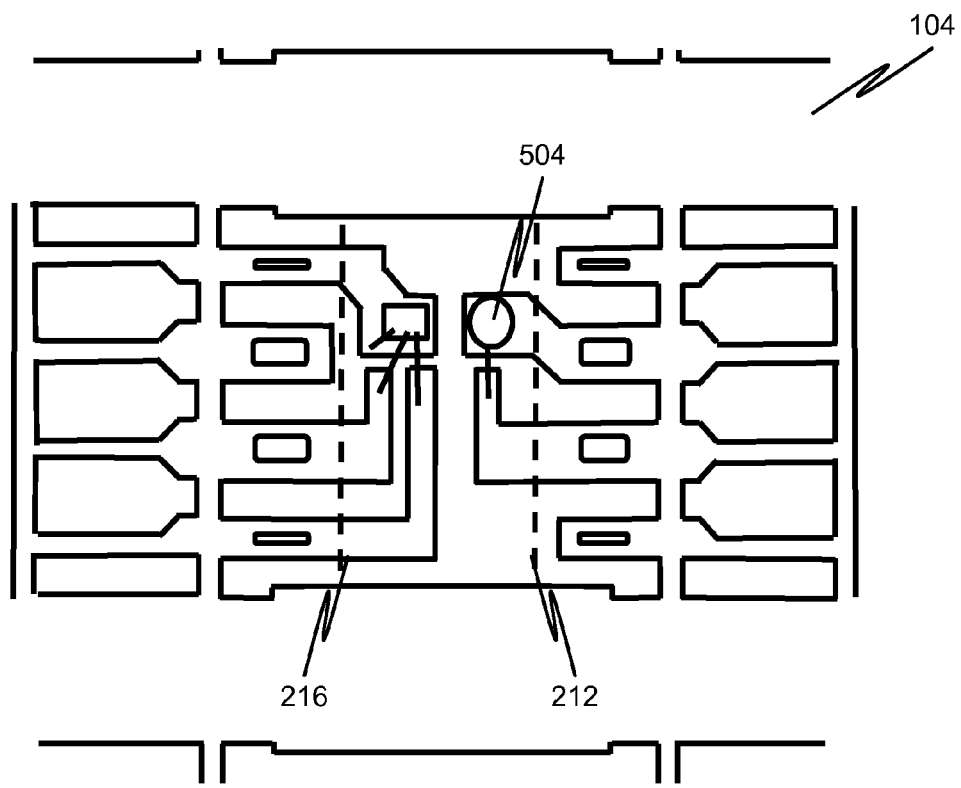
FIG. 5A is a top view of an opto-coupler in a fifth manufacturing step in accordance with embodiments of the present disclosure.
Figure 5B:
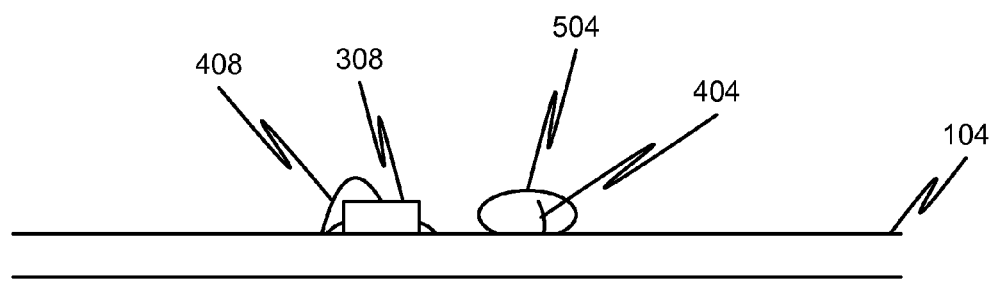
FIG. 5B is a side view of the opto-coupler depicted in FIG. 5A.

An optional manufacturing step is depicted in FIGS. 5A and 5B. Specifically, the light source 304 and/or light detector 308 may be partially or completely covered with a protective material 504 (step 1116). In some embodiments, an optically transparent or translucent material may be used as the protective material 504, especially if the protective material 504 completely covers an optical component, such as the light source 304. The protective material 504 may also preferably comprise non-conductive or insulative properties. Suitable types of materials that may be used as the protective material 504 include, without limitation epoxy, silicone, a hybrid of silicone and epoxy, phosphor, a hybrid of phosphor and silicone, an amorphous polyamide resin or fluorocarbon, glass, plastic, or combinations thereof. In some embodiments, the protective material 504 provides physical protection for the optical component (e.g., light source 304) as well as the connection between the wire 404 and the optical component. However, the protective material 504 does not necessarily need to cover the entire wire in addition to covering the optical component. Accordingly, the wire 404 may protrude from the protective material 504 and extend to a different lead (e.g., lead 120c).

Figure 6A:
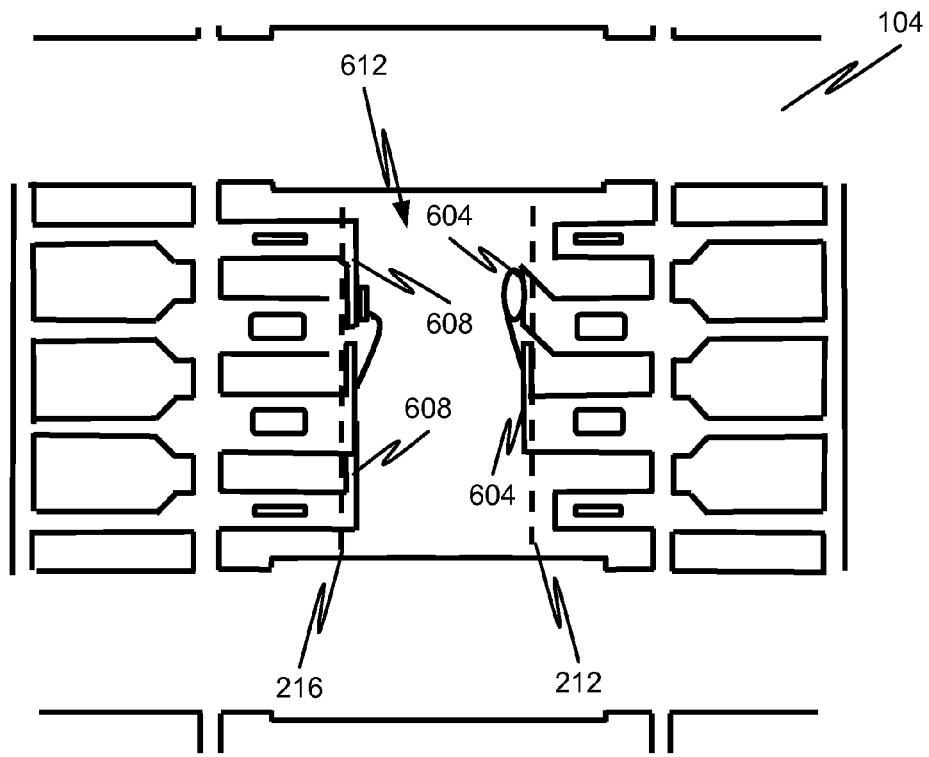
FIG. 6A is a top view of an opto-coupler in a sixth manufacturing step in accordance with embodiments of the present disclosure.
Figure 6B:
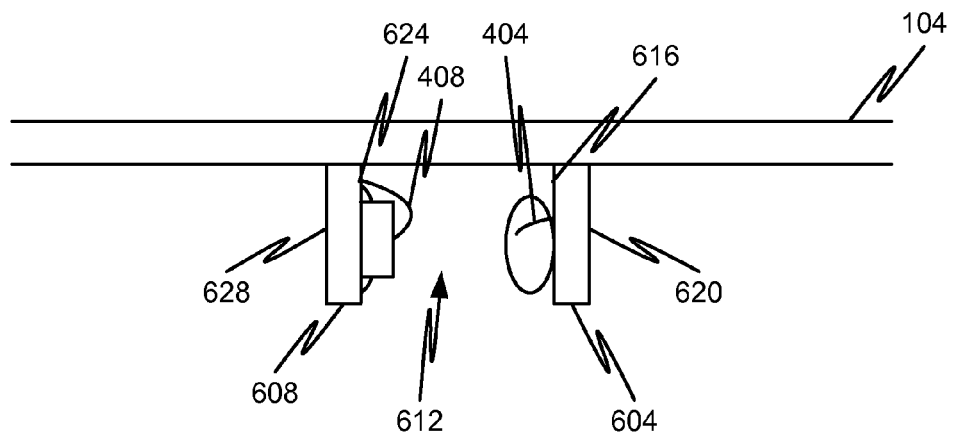
FIG. 6B is a side view of the opto-coupler depicted in FIG. 6A.
Figure 12:
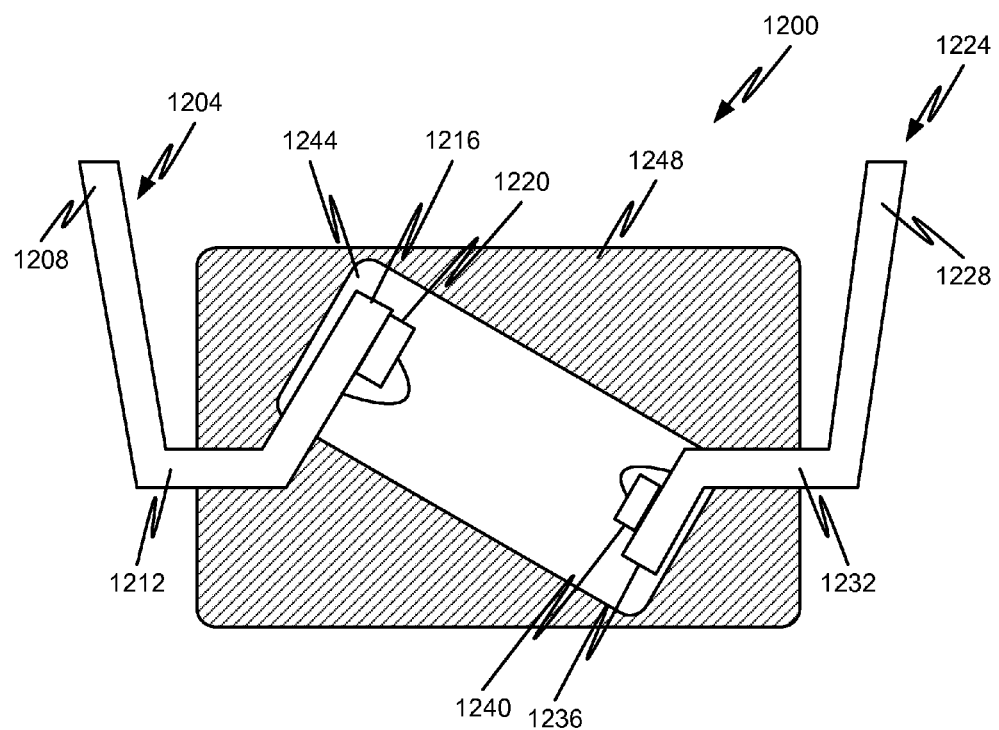
FIG. 12 is a cross-sectional view of an alternative opto-coupler design in accordance with embodiments of the present disclosure.

The next step in the manufacturing process may include one or more folding steps where the leadframe 104, or leads 120, 124 of the leadframe are folded at or about the fold lines 212, 216 (step 1120). FIGS. 6A and 6B depict the optocoupler after both leads 120, 124 have been folded at or about the fold lines 212, 216. In some embodiments, the leads 120, 124 are folded in the same direction (e.g., both upward or both downward) such that both the light source 304 and light detector 308 are moved away from the original plane of the leadframe 304 in the y-direction and are not separated by the original plane of the leadframe 304. In some embodiments, one or more leads of the first side 108 may be folded in one direction (e.g., upward) while one or more leads of the second side 112 may be folded in the opposite direction (e.g., downward). This opposite folding may result in the light source 304 being separated from the light detector 308 by the original plane of the leadframe 304. An example of such a configuration is depicted in FIG. 12. Yet another possible folding configuration may involve folding one or more leads of one side (e.g., folding one or more of leads 120a-d) and not folding any leads of the other side (e.g., not folding any of leads 124a-d).

Although FIGS. 6A and 6B depict the leads 120, 124 being folded in the same direction and being folded to an angle that is approximately orthogonal to the original plane of the leadframe 104 (e.g., parallel to the y-plane), it should be appreciated that embodiments of the present disclosure are not so limited. Rather, one or both leads 120, 124 may be folded by any angle varying between 1 degree and 179 degrees. The amount of folding performed in this step may depend on the material properties of the leadframe 104 and whether the material can undergo significant folding without breaking or inadvertently deforming.

The 90 degree folding configuration of FIGS. 6A and 6B may be advantageous when both leads 120, 124 are folded in the same direction because such a folding configuration may result in the light source 304 directly facing the light detector 308. This direct facing of optical components may help increase the efficiency with which light transmitted by the light source 304 is detected at the light detector 308, thereby improving the operational behavior of the opto-coupler.

As can be seen in FIG. 6A, the folding of the leads 120, 124 may establish an enhanced isolation gap 612. Specifically, the enhanced isolation gap 612 is larger than the original isolation gap 116 in the x-direction or x-plane. The example of FIGS. 6A and 6B show that the enhanced isolation gap 612 does not comprise any substantial dimension in the y-direction or y-plane, in particular, because the leads 120, 124 have been folded in the same direction. It should be appreciated that such a configuration is not required.

The enhanced isolation gap 612 helps to increase the creepage distance between the leads 120 of the first side 108 and the leads 124 of the second side 112. More specifically, the increased isolation gap 612 may have a distance corresponding to the linear distance between a bonding surface 616 of the folded section of the first side 604 and a bonding surface 624 of the folded section of the second side 608. These bonding surfaces may correspond to the original bonding surfaces of the leads 120, 124 that were originally in the x-plane, but due to the folding of the leads 120, 124 are now out of the x-plane. The enhanced isolation gap 612 can increase the voltage handling capabilities of the opto-coupler. In some embodiments, voltage capacities can be doubled by simply folding one or both leads 120, 124. As a non-limiting example, the enhanced isolation gap 612 may comprise a distance of between approximately 2 mm and 7 mm.

Because the enhanced isolation gap 612 comprises its primary dimensions in the x-plane (e.g., the original plane of the leadframe 104 and the major axis of the opto-coupler), it is possible to greatly increase the creepage distance without significantly altering the size of the opto-coupler itself or without significantly complicating the manufacturing process of the opto-coupler.

The folded section of the first side 604 may also have a first opposing surface 620 that opposes the bonding surface 616. Similarly, the folded section of the second side 608 may comprise a second opposing surface 628 that opposes the bonding surface 624. The first opposing surface 620 may coincide with the first fold line 212 and the second opposing surface 628 may coincide with the second fold line 216.

After one or both leads 120, 124 have been folded and the enhanced isolation gap 612 has been appropriately sized, the manufacturing process may continue with the application of a first mold material 704 to the opto-coupler (step 1124).

Figure 7A:
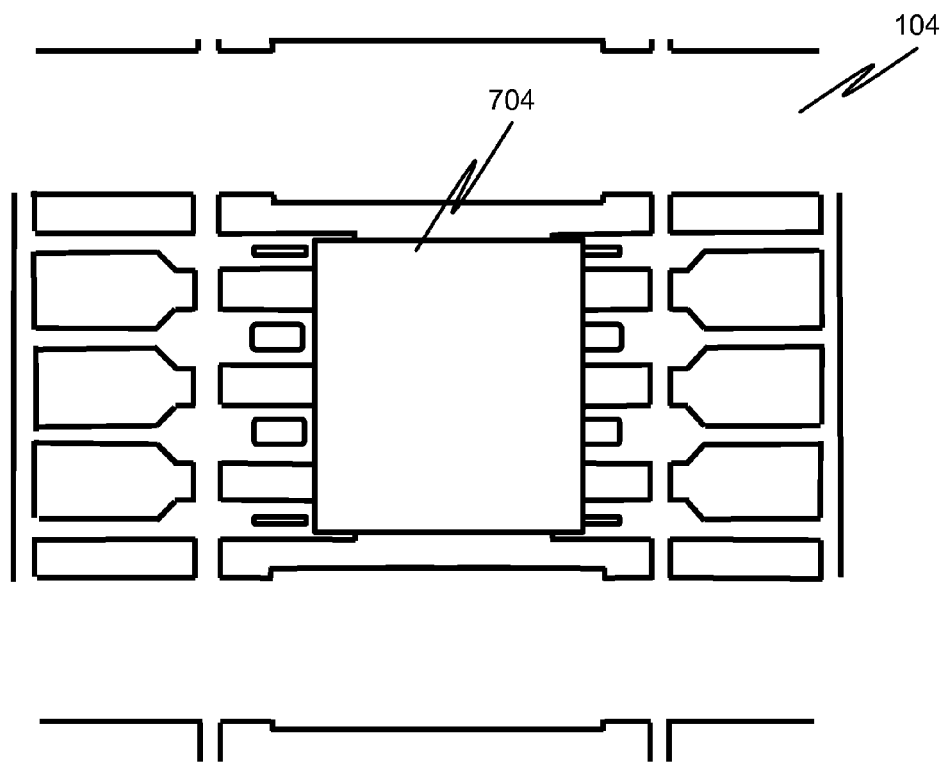
FIG. 7A is a top view of an opto-coupler in a seventh manufacturing step in accordance with embodiments of the present disclosure.
Figure 7B:
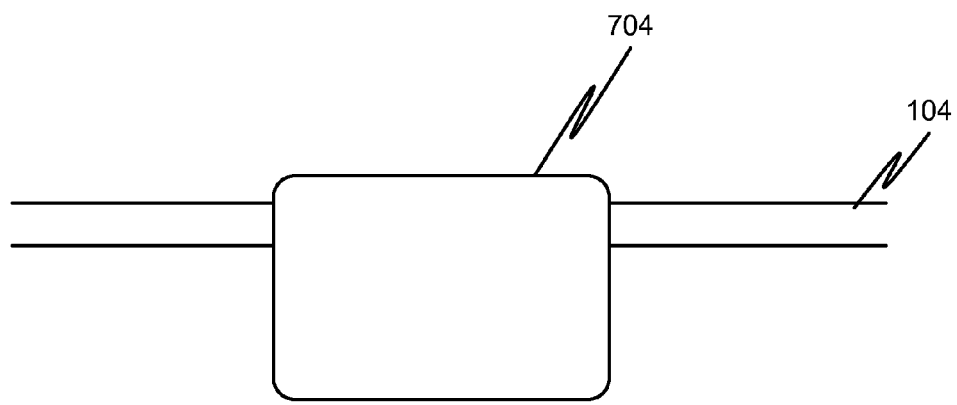
FIG. 7B is a side view of the opto-coupler depicted in FIG. 7A.

Specifically, as can be seen in FIGS. 7A and 7B, an optically translucent or transparent first mold material 704 may be applied around both leads 120, 124 to essentially fix the relative positions of the leads 120, 124, the optical components attached thereto, and the size of the enhanced isolation gap 612.

In some embodiments, the first mold material 704 may be constructed of any polymer or combination of polymers that are optically translucent or transparent using extrusion, machining, micro-machining, molding, injection molding, or a combination of such manufacturing techniques. Furthermore, the first mold material 704 may comprise insulative properties, thereby inhibiting the flow of current from the first side 108 to the second side 112 across the enhanced isolation gap 612.

Figure 8A:
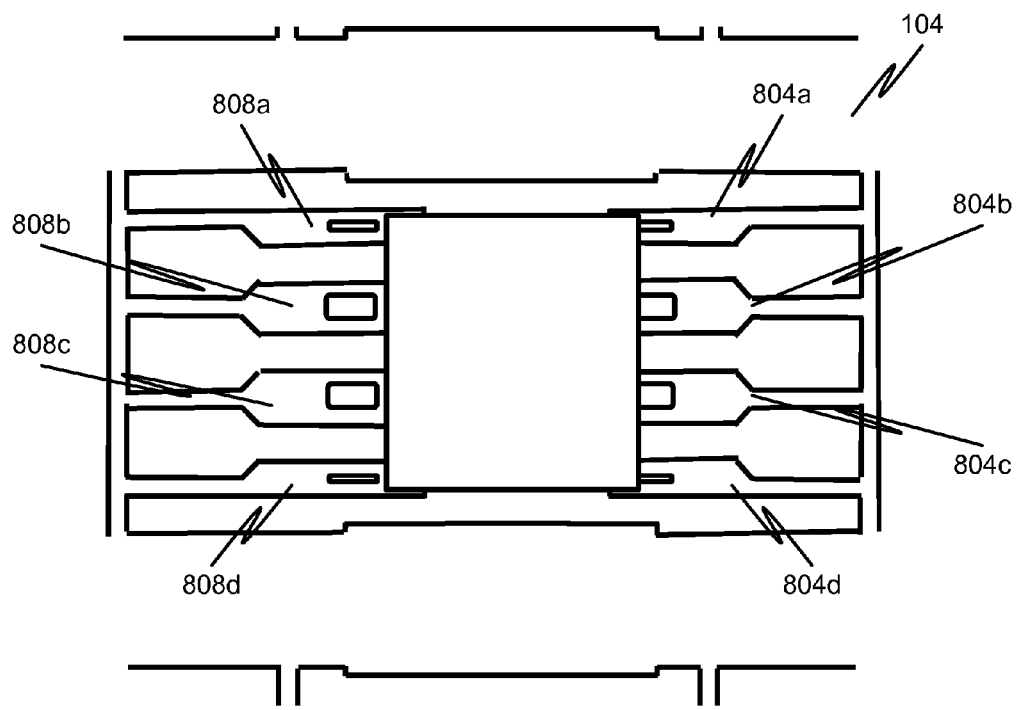
FIG. 8A is a top view of an opto-coupler in an eighth manufacturing step in accordance with embodiments of the present disclosure.
Figure 8B:
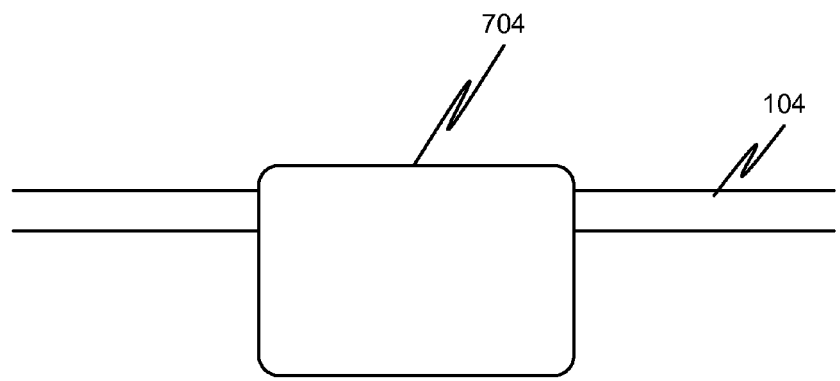
FIG. 8B is a side view of the opto-coupler depicted in FIG. 8A.

FIGS. 8A and 8B show a next step in the manufacturing process whereby a first trimming of the leadframe 104 is performed (step 1128). In some embodiments, the first trimming step removes certain amounts of materials from the leadframe 104 to create first trimmed leads 804a-d on the first side 108 and first trimmed leads 808a-d on the second side 108. The first trimmed leads 804, 808 are still in the original plane of the leadframe 104, but are now sized to be inserted into a Printed Circuit Board (PCB) or the like.

Figure 9A:
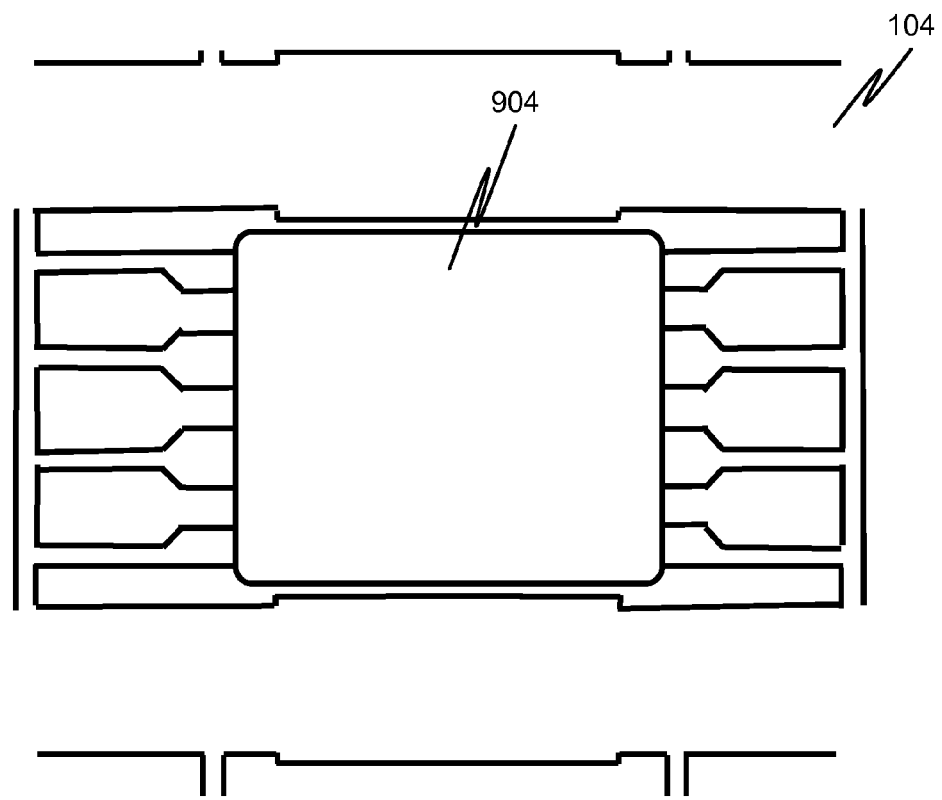
FIG. 9A is a top view of an opto-coupler in a ninth manufacturing step in accordance with embodiments of the present disclosure.
Figure 9B:
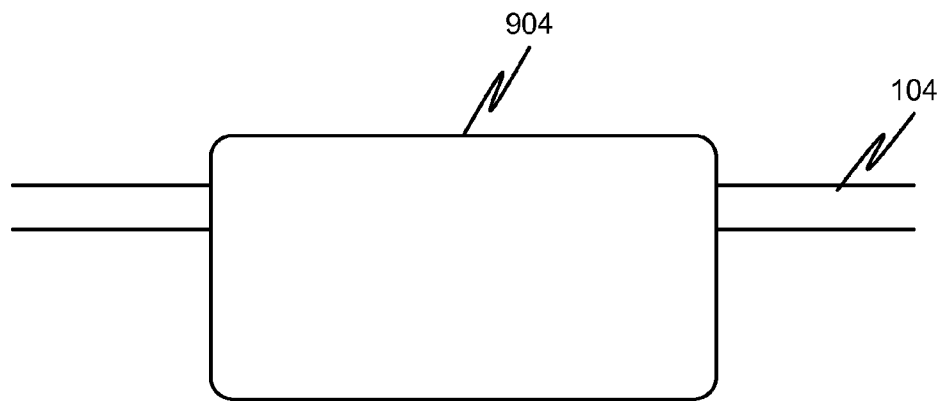
FIG. 9B is a side view of the opto-coupler depicted in FIG. 9A.

FIGS. 9A and 9B show a next step in the manufacturing process where a second mold material 904 is applied around the first mold material 704 (step 1132). The second mold material 904 may completely enclose the first mold material 704. In some embodiments, the second mold material 904 is insulative and optically opaque. The second mold material 904 helps to ensure that external light doesn't reach the optical cavity of the opto-coupler (e.g., the enhanced isolation gap 612 and the first mold material 704). The second mold material 904 also helps to ensure that light emitted by the light source 304 does not exit the opto-coupler, thereby increasing the efficiency of optical coupling between the light source 304 and light detector 308.

Figure 10A:
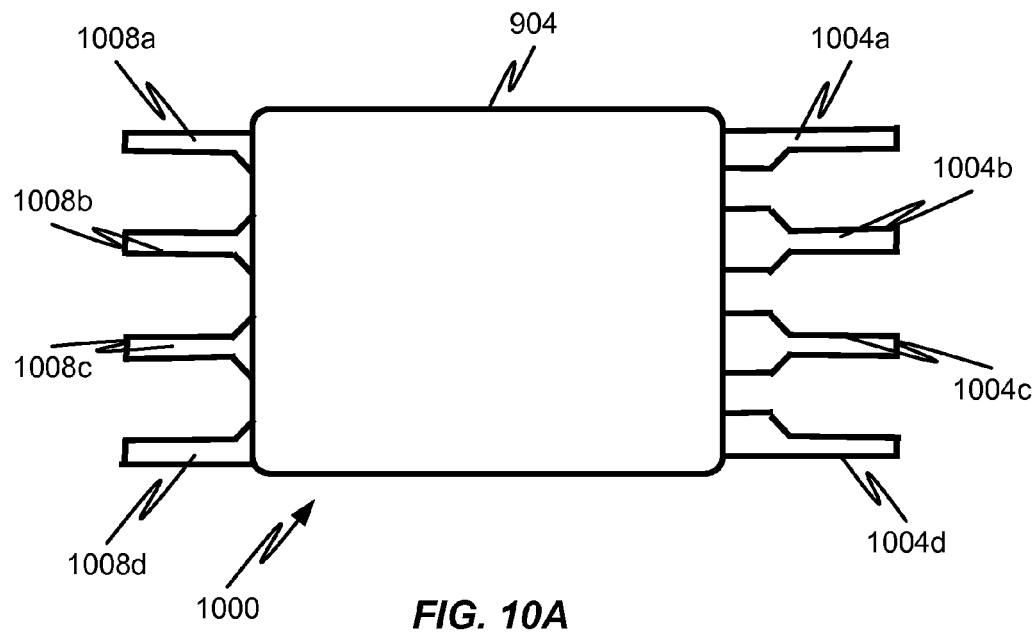
FIG. 10A is a top view of an opto-coupler in a tenth manufacturing step in accordance with embodiments of the present disclosure.
Figure 10B:
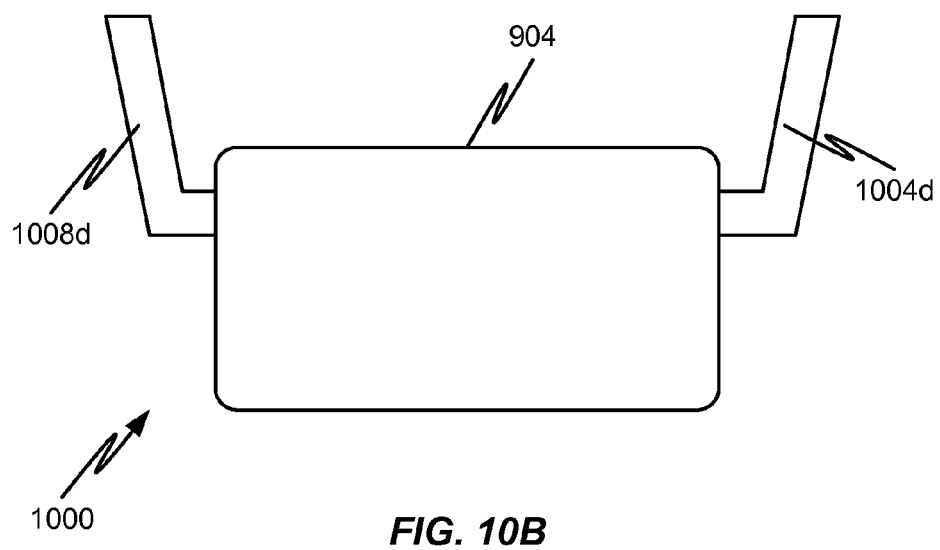
FIG. 10B is a side view of the opto-coupler depicted in FIG. 10A.
Figure 11:
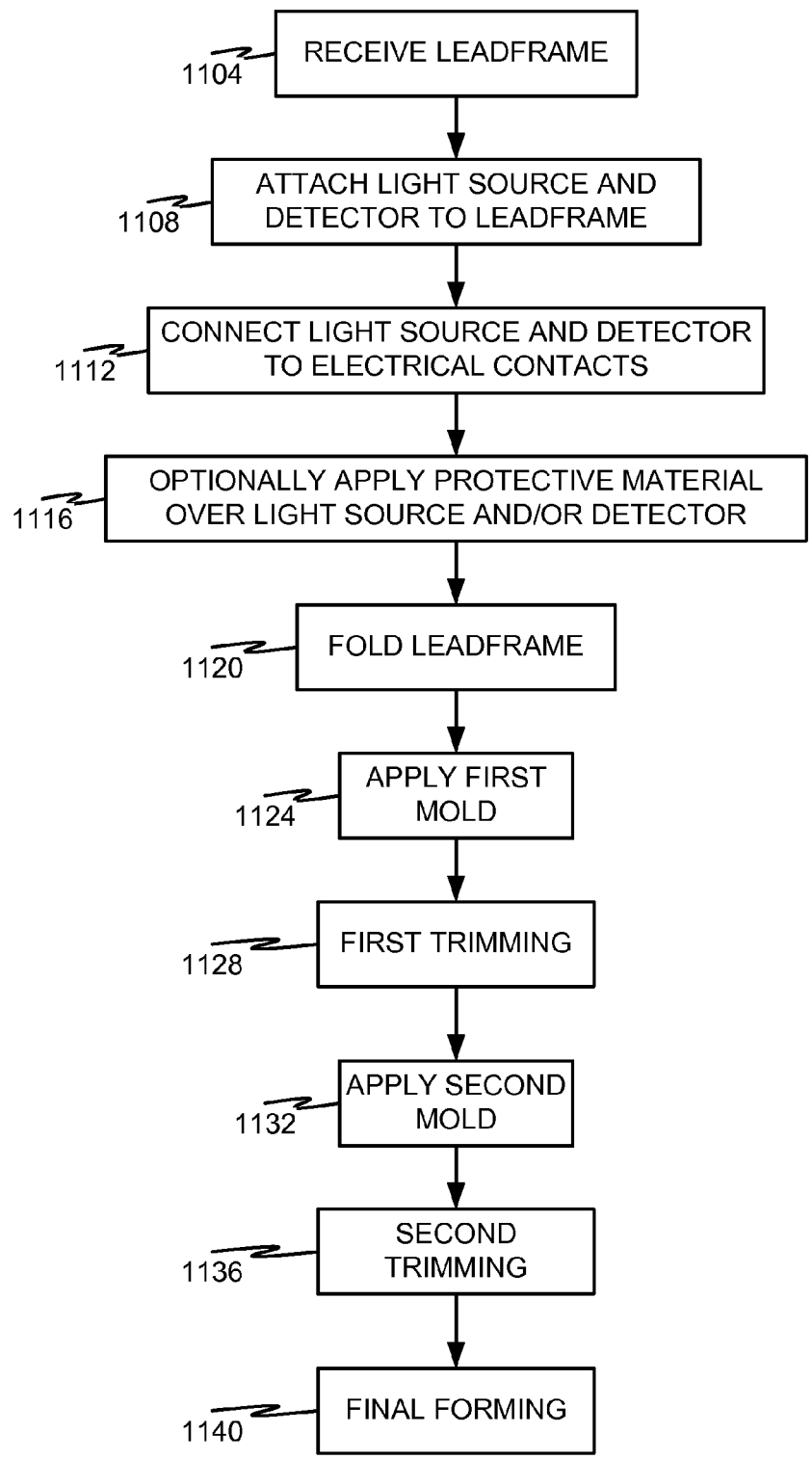
FIG. 11 is a flow chart depicting a method of manufacturing an opto-coupler in accordance with embodiments of the present disclosure.

Thereafter, a second trimming step may be performed (step 1136) to singulate the opto-coupler from the rest of the leadframe sheet 100 and then the leads may be finally formed to create formed leads (step 1140). Specifically, the finally formed leads may be bent such that the opto-coupler is easily inserted into a PCB or the like. As can be seen in FIGS. 10A and 10B, the first side 108 may comprise a first set of finally formed leads 1004a-d and the second side 112 may comprise a second set of finally formed leads 1008a-d. The finally formed leads 1004, 1008 may be bent or folded away from the original plane of the leadframe 104 (e.g., to have a dimension in the y-plane).

With reference now to FIG. 12, details of an alternative configuration of an opto-coupler 1200 will be described in accordance with embodiments of the present disclosure. The opto-coupler 1200 may comprise first leadframe portion 1204 and a second leadframe portion 1224. The first leadframe portion 1204 may correspond to one of the input or output side of the opto-coupler 1200 and the second leadframe portion 1224 may correspond to the other of the input or output side of the opto-coupler 1200. Whether a portion corresponds to an input or output side may be dictated by whether a light source or light detector is mounted thereto. For conversational purposes, the first leadframe portion 1204 may correspond to an output side and the second leadframe portion 1224 may correspond to an input side.

The first leadframe portion 1204 may comprise a first section 1208, a second section 1212, and a third section 1216. Similarly, the second leadframe portion 1224 may comprise a first section 1228, a second section 1232, and a third section 1236. The second sections 1212, 1232 may be considered to be completely in the x-plane whereas the other sections may have a dimension in the y-plane.

The first sections 1208, 1228 may be configured to be inserted into a PCB or the like. The second sections 1212, 1232 may be in-plane with one another. The third sections 1216, 1236 may have been originally in the same plane as the second sections 1212, 1232, but may have been folded at a fold line to move the third sections 1216, 1236 out of plane with the second sections 1212, 1232. Contrary to the examples of FIGS. 1A-10B, the opto-coupler 1200 had its leads folded in opposite directions. Thus, the third section 1216 of the first leadframe portion 1204 may be separated by the third section 1236 of the second leadframe portion 1224 by the plane established by the second sections 1212, 1232. This means that the enhanced isolation gap between the leadframe portions 1204, 1224 has dimensions in both the x-direction and the y-direction.

Because the leads were folded in opposite directions, the light detector 1220 and light source 1240 may have been bonded to opposing sides of the leadframe before the leads were folded. In other words, the light detector 1220 may be mounted or bonded to a first surface of the leadframe and the light source 1240 may be mounted or bonded to an opposing second surface of the leadframe such that when the leads are folded in opposite directions, the light source 1240 is generally facing towards the light detector 1220.

Similar to the other opto-couplers described herein, the opto-coupler 1200 may comprise a first mold material 1244 that fixes the leadframe portions 1204, 1224 relative to one another and creates the optical pathway between the light source 1240 and light detector 1220. In some embodiments, the first mold material 1244 may be similar or identical to the first mold materials described in connection with the other opto-couplers. In particular, the first mold material 1244 may be optically clear or translucent, thereby allowing light emitted by the light source 1240 to travel to the light detector 1220 either directly or indirectly.

The opto-coupler 1200 may also comprise a second mold material 1248 that surrounds or encapsulates the first mold material 1244. The second mold material 1248 may be similar or identical to the other second mold materials described herein. Specifically, the second mold material 1248 may be optically opaque or non-transmissive and may maintain the integrity of the optical pathway established by the first mold material 1244.

Although embodiments of the present disclosure do not show the leads as having a specific configuration, it should be appreciated that the leads or relevant sections protruding from the second mold material may comprise any type of known, standardized, or yet-to-be developed configuration such as straight-cut leads, J leads, SOJ leads, gullwing, reverse gullwing, etc.

Additionally, although only single channel opto-coupler devices have been depicted and described herein, it should be appreciated that embodiments of the present disclosure are not so limited. In particular, it is contemplated that opto-coupler devices having one, two, three, four, five, six, . . . , twenty, or more channels may be created with enhanced isolation gaps without departing from the scope of the present disclosure.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. An opto-coupler device having a major length and width in a first plane and a thickness in a second plane that is orthogonal to the first plane, the opto-coupler device comprising:
    a leadframe comprising one or more input leads that are electrically isolated from one or more output leads;
    a light source configured to emit light according to electrical signals received from the one or more input leads, wherein the light source is mounted to a bonding surface of a first lead, the first lead being in the one or more input leads;
    a light detector configured to detect light emitted by the light source and convert the detected light into electrical signals for transmission by the one or more output leads, wherein the light detector is mounted to a bonding surface of a second lead, the second lead being in the one or more output leads; and
    an enhanced isolation gap established between the first lead and the second lead and corresponding to a shortest linear distance between the first lead and second lead, wherein at least one of the first and second lead are folded such that the bonding surface of the folded lead is not co-planar with the first plane, and wherein the enhanced isolation gap comprises a measurable width in the first plane, wherein the first lead and second lead are folded in a common direction away from the first plane and toward the second plane.

2. The opto-coupler device of claim 1, wherein both the first and second lead are folded such that the bonding surface of the first lead is not parallel with the first plane and the bonding surface of the second lead is not parallel with the first plane.

3. The opto-coupler device of claim 2, wherein the first lead is folded more than 1 degree away from the first plane and less than 90 degrees away from the first plane, and wherein the second lead is folded more than 1 degree away from the first plane and less than 90 degrees away from the second plane.

4. The opto-coupler device of claim 1, wherein the enhanced isolation gap comprises substantially no measurable height in the second plane.

5. The opto-coupler device of claim 1, wherein the bonding surface of the first lead is orthogonal to the first plane and parallel to the second plane and wherein the bonding surface of the second lead is orthogonal to the first plane and parallel to the second plane.

6. The opto-coupler device of claim 1, wherein the light source comprises a Light Emitting Diode (LED) and the light detector comprises a photodiode.

7. The opto-coupler device of claim 1, further comprising:
    a first mold material that is configured to establish an optical pathway between the light source and light detector, the first mold material substantially enclosing the light source and light detector; and
    a second mold material that surrounds the first mold material, the second mold material being substantially optically opaque.

8. An opto-coupler device having a length and width in a first plane and a thickness in a second plane that is orthogonal to the first plane, the opto-coupler device comprising:
   a leadframe comprising one or more input leads that are electrically isolated from one or more output leads;
   a light source configured to emit light according to electrical signals received from the one or more input leads, wherein the light source is mounted to a bonding surface of a first lead, the first lead being in the one or more input leads;
   a light detector configured to detect light emitted by the light source and convert the detected light into electrical signals for transmission by the one or more output leads, wherein the light detector is mounted to a bonding surface of a second lead, the second lead being in the one or more output leads; and
   an enhanced isolation gap established between the first lead and the second lead and corresponding to a shortest linear distance between the first lead and second lead, wherein at least one of the first and second lead are folded such that the bonding surface of the folded lead is not co-planar with the first plane, and wherein the enhanced isolation gap comprises a measurable width in the first plane, wherein the first lead and the second lead are folded in opposite directions away from the first plane, wherein the first lead is folded more than 1 degree away from the first plane and less than 90 degrees away from the first plane, and wherein the second lead is folded more than 1 degree away from the first plane and less than 90 degrees away from the second plane.

9. The opto-coupler device of claim 8, wherein the bonding surface of the first lead is substantially parallel to the bonding surface of the second lead.

10. The opto-coupler device of claim 8, wherein the enhanced isolation gap comprises a measurable height in the second plane.

11. The opto-coupler device of claim 8, further comprising:
   a first mold material that is configured to establish an optical pathway between the light source and light detector, the first mold material substantially enclosing the light source and light detector; and
   a second mold material that surrounds the first mold material, the second mold material being substantially optically opaque.

12. An opto-coupler, comprising:
   a first input lead having a first section, a second section, and a third section, the first section of the first input lead being configured to be inserted into an external device, the second section of the first input lead being folded or bent relative to the first section of the first input lead and being in a first plane, and the third section of the first input lead being folded or bent relative to the second section of the first input lead and being non-parallel with the first plane;
   a first output lead having a first section, a second section, and a third section, the first section of the first output lead being configured to be inserted into an external device, the second section of the first output lead being folded or bent relative to the first section of the first output lead and being substantially co-planar with the first plane, and the third section of the first output lead being folded or bent relative to the second section of the first output lead and being non-parallel with the first plane; and
   an enhanced isolation gap corresponding to a shortest distance though an insulator between the third section of the first input lead and the third section of the first output lead, the enhanced isolation gap having a measurable width in the first plane.

13. The opto-coupler of claim 12, wherein the third section of the first input lead and the third section of the first output lead are separated by the first plane.

14. The opto-coupler of claim 12, wherein the third section of the first input lead and the third section of the first output lead are not separated by the first plane.

15. The opto-coupler of claim 12, further comprising:
   a light source mounted to the third section of the first input lead; and
   a light detector mounted to the third section of the first output lead.

16. The opto-coupler of claim 15, further comprising a first mold material that is at least one of optically transparent and optically translucent, the first mold material enclosing the light source and light detector to establish an optical pathway between the light source and light detector.

17. The opto-coupler of claim 12, wherein the third section of the first input lead is substantially orthogonal to the second section of the first input lead, wherein the third section of the first output lead is substantially orthogonal to the second section of the first output lead.

18. An opto-coupler manufactured by a method, the method comprising:
   receiving a leadframe having an input side and an output side separated by a first isolation gap, the first isolation gap corresponding to a first shortest distance between the input side and the output side;
   attaching a light source to the input side;
   attaching a light detector to the output side;
   electrically connecting the light source to the input side with one or more input side wires;
   electrically connecting the light detector to the output side with one or more output side wires; and
   folding a portion of at least one of the input side and output side, wherein folding the portion of the at least one of the input side and output side establishes an enhanced isolation gap corresponding to a second shortest distance between the input side and the output side, and wherein the second shortest distance is larger than the first shortest distance, wherein the leadframe is received as a substantially planar sheet of metal, wherein the first shortest distance is entirely in a first plane that coincides with the sheet of metal, and wherein the second shortest distance is larger than the first shortest distance in parallel with the first plane.

19. The method of claim 18, wherein both the input side and output side are folded.

20. The method of claim 18, wherein the input side and the output side are folded in opposite directions away from the first plane.

* * * * *